United States Patent [19]
Morinaga et al.

[11] Patent Number: 5,724,578
[45] Date of Patent: Mar. 3, 1998

[54] FILE MANAGING SYSTEM FOR MANAGING FILES SHARED WITH A PLURALITY OF USERS

[75] Inventors: Masanobu Morinaga; Masahiko Murakami; Tadashige Iwao; Satoshi Okuyama; Noriyuki Fukuyama; Masahiro Matsuda; Sumiyo Taoka, all of Kawasaki, Japan

[73] Assignee: Fujitsu Limited, Kawasaki, Japan

[21] Appl. No.: 524,576

[22] Filed: Sep. 7, 1995

[30] Foreign Application Priority Data

Dec. 7, 1994  [JP]  Japan ................................ 6-303944

[51] Int. Cl.$^6$ .................................................. G06F 17/30
[52] U.S. Cl. ...................... 395/611; 395/609; 395/490; 395/491
[58] Field of Search .......................... 395/601, 611, 395/609, 490, 491

[56] References Cited

U.S. PATENT DOCUMENTS

| | | | |
|---|---|---|---|
| 4,135,240 | 1/1979 | Ritchie | 364/200 |
| 5,012,405 | 4/1991 | Nishikado et al. | 364/200 |
| 5,047,918 | 9/1991 | Schwartz et al. | 364/200 |
| 5,113,442 | 5/1992 | Moir | 380/25 |
| 5,313,646 | 5/1994 | Hendricks et al. | 395/600 |

FOREIGN PATENT DOCUMENTS

| | | |
|---|---|---|
| 0 615 192 | 9/1994 | European Pat. Off. |
| 4-373040 | 12/1992 | Japan. |

*Primary Examiner*—Thomas G. Black
*Assistant Examiner*—Jean M. Corrielus
*Attorney, Agent, or Firm*—Staas & Halsey

[57] ABSTRACT

A file managing system manages a plurality of files shared with a plurality of users. The files are linked to each other, and are controlled in accordance with link information. File control information is defined to represent a status of rights given to each of the users who is permitted to perform a processing which corresponds to one of the rights the status of which is in an on-state. The file control information is produced for each of the files. Link control information including link information representing a condition of the link between the first file and the second file is defined. The link control information further includes information which represents whether each of the users is permitted to use the link. The link control information is produced for each of the files. The access of each of said users to the files and the access of each of users to the link is controlled in accordance with the file control information and the link control information. The link control information may further include first propagation information which represents whether a processing performed on a first file is to be reflected to a second file so that a processing performed on the second file may be controlled, when the first file is processed, in accordance with the first propagation information.

18 Claims, 36 Drawing Sheets

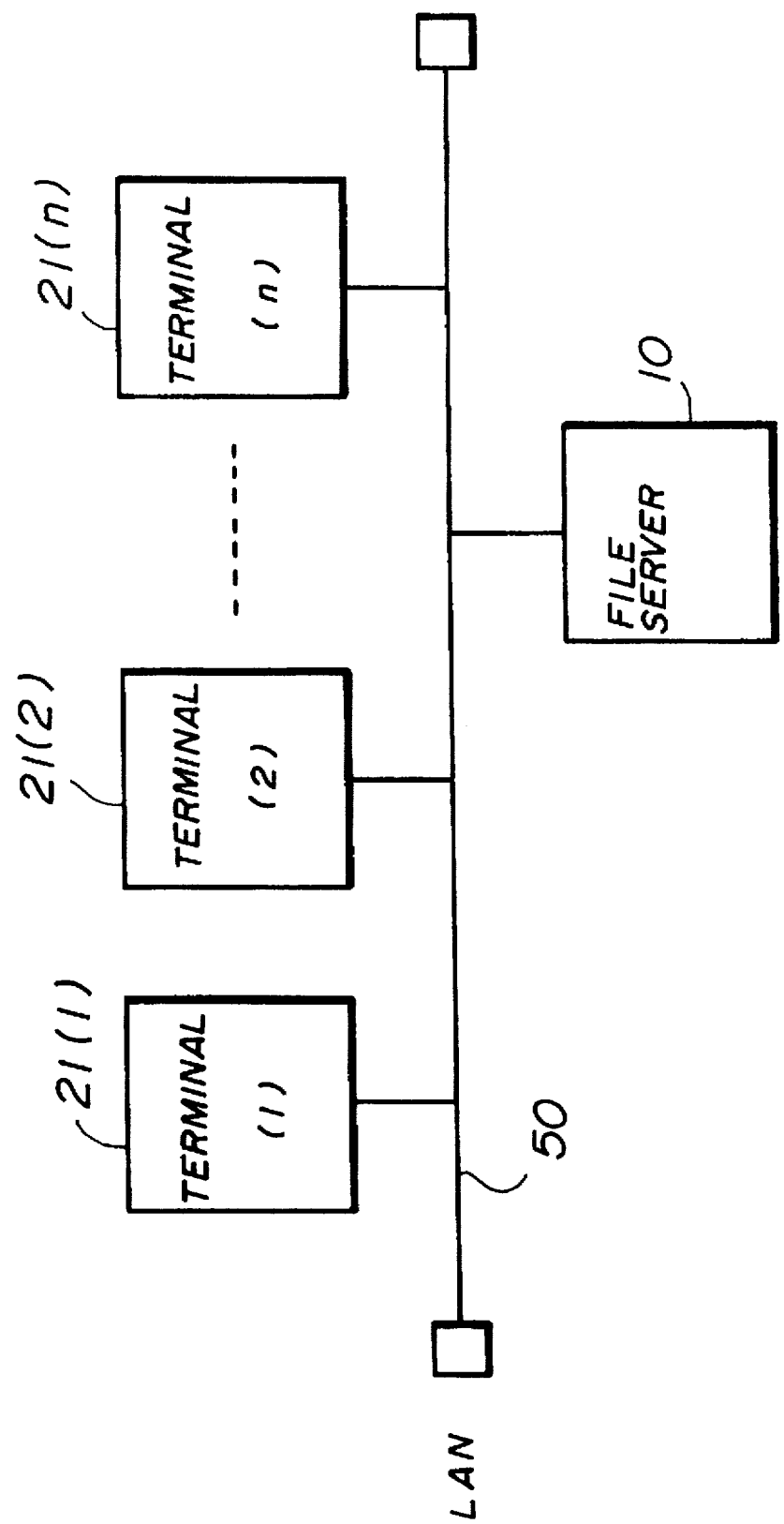

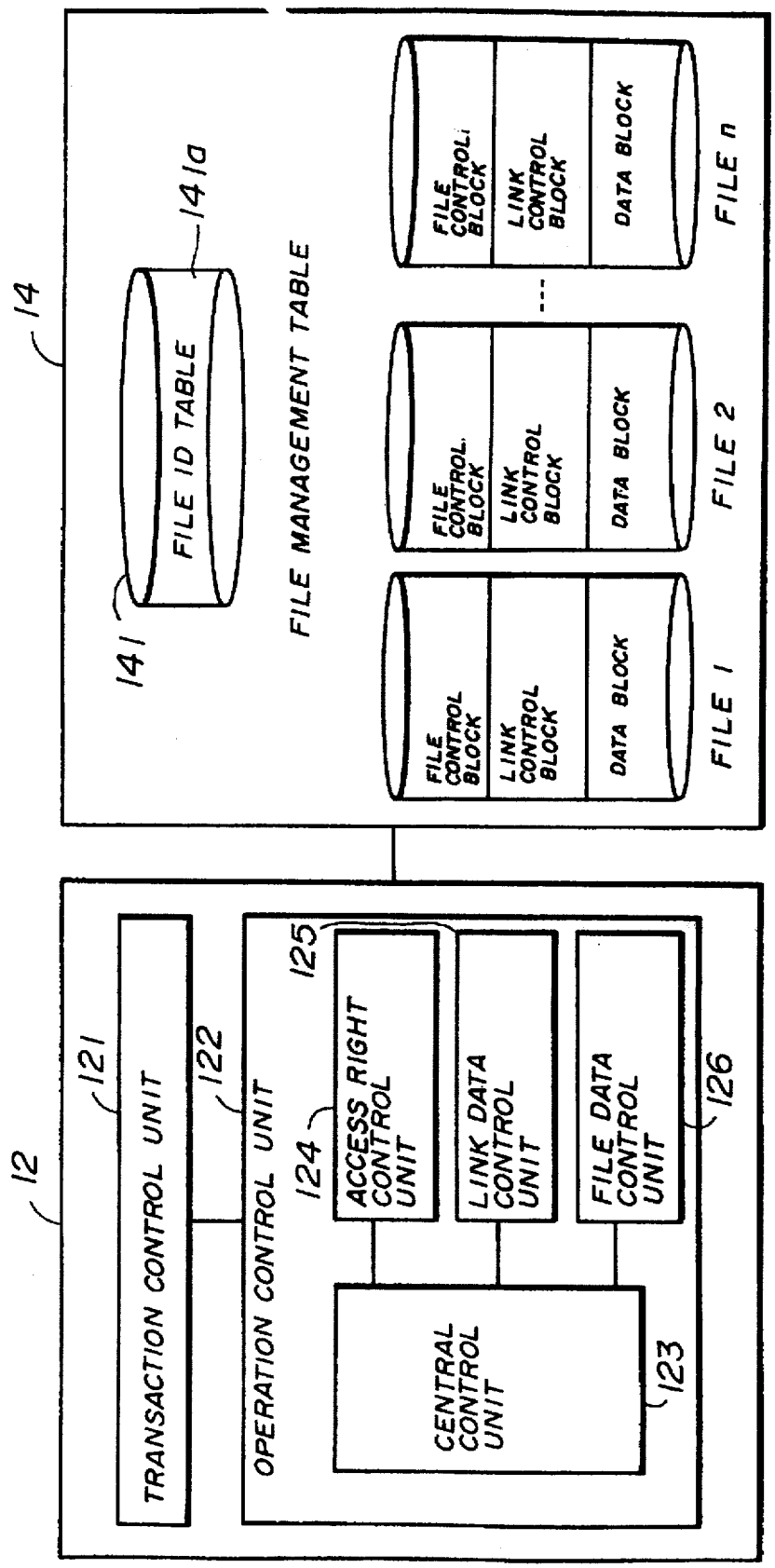

FIG. 3A

FILE CONTROL BLOCK

| ACCESS RIGHTS OF USER 1 | | | | | |
|---|---|---|---|---|---|
| VISIBLE | READ | WRITE | COPY | DELETE | OWNER |

| ACCESS RIGHT OF USER 2 | | | | | |
|---|---|---|---|---|---|
| VISIBLE | READ | WRITE | COPY | DELETE | OWNER |

- - - -

FILE NAME

FILE CREATOR

LINK CONTROL BLOCK

LINK ID

RELATED LINK LIST

| LINK 1 | LINK 2 | LINK 3 | - - - - - |
|---|---|---|---|

ACCESS RIGHTS OF USER 1

| VISIBLE | OWNER |
|---|---|

ACCESS RIGHTS OF USER 2

| VISIBLE | OWNER |
|---|---|

- - - - -

FILE CONTROL

| ACCESS RIGHT INCREASE PROPAGATION FLAGS | ACCESS RIGHT INCREASE PROPAGATION FLAGS | DELETE PROPAGATION FLAGS |
|---|---|---|
| LINK KIND | | LINK CANCEL |

FILE DATA BLOCK

FIG.5A

| VISIBLE | READ | WRITE | COPY | DELETE | OWNER |
|---------|------|-------|------|--------|-------|

ACCESS RIGHT INCREASE PROPAGATION FLAGS

FIG.5B

| VISIBLE | READ | WRITE | COPY | DELETE | OWNER |
|---------|------|-------|------|--------|-------|

ACCESS RIGHT DECREASE PROPAGATION FLAGS

FIG.6

| VALUE OF LINK KIND | LINK KIND |
|---|---|
| 1 | MEMO-LINK |
| 2 | STAPLE-LINK |
| 3 | REFERENCE-LINK |

FIG. 7A

LINK CANCEL FIELD

| SOURCE FILE | DESTINATION FILE | INTEGER VALUE OF LINK CANCEL METHOD |
|---|---|---|

FIG. 7B

| VALUE OF LINK CANCEL METHOD | LINK CANCELING METHOD |
|---|---|
| 1 | LINK IS CANCELED WHEN SOURCE FILE IS DELETED |
| 2 | LINK IS ASLO CANCELED WHEN DESTINATION FILE IS DELETED |

FIG. 9

| LINK ID | LINK 1 | | |
|---|---|---|---|
| LINK CANCEL FIELD (RELATED FILES) | SOURCE FILE NAME | DESTINATION FILE NAME | |
| | FILE 1 | FILE 2 | |
| RELATED LINK LIST | LINK 2 | LINK 3 | ------- | LINK n-1 |
| DELETE PROPAGATION FLAG | OFF | | |
| LINK KIND FIELD | 2 | | |
| LINK CANCEL FIELD | 2 | | |

FIG. 10

| LINK ID | LINK m | |
|---|---|---|
| LINK CANCELL FIELD (RELATED FILES) | SOURCE FILE NAME | DESTINATION FILE NAME |
| | FILE | FILE m+1 |
| RELATED LINK LIST | NIL | |
| DELETE PROPAGATION FLAG | OFF | |
| LINK KIND FIELD | 2 | |
| LINK CANCEL FIELD | 2 | |

FIG. 12

| | VISIBLE | READ | WRITE | COPY | DELETE | OWNER |
|---|---|---|---|---|---|---|
| ACCESS RIGHT INCREASE PROPAGATION FLAGS | ON | ON | ON | ON | ON | ON |
| | VISIBLE | READ | WRITE | COPY | DELETE | OWNER |
| ACCESS RIGHT DECREASE PROPAGATION FLAGS | ON | ON | ON | ON | OFF | ON |
| DELETE PROPAGATION FLAG | ON | | | | | |
| LINK KIND FIELD | / | | | | | |
| LINK CANCEL FIELD (RELATED FILES) | SOURCE FILE | | DESTINATION FILE | | | |
| | FILE 1 | | FILE 2 | | | |
| LINK CANCEL FIELD (INTEGER) | / | | | | | |

FIG. 13

| DELETE TRANSMISSION FIELD | | | OFF |
|---|---|---|---|
| LINK KIND FIELD | | | 3 |
| LINK CANCEL FIELD (RELATED FIELS) | SOURCE FILE | DESTINATION FILE | |
| | FILE 1 | FILE 2 | |
| LINK CANCEL FIED (INTEGER) | | | 1 |

FIG. 14A

| FILE CONTROL BLOCK | | | | | | |
|---|---|---|---|---|---|---|
| FILE NAME | FILE 1 | | | | | |
| ACCESS RIGHTS OF USER 1 | | | | | | |
| | VISIBLE | READ | WRITE | COPY | DELETE | OWNER |
| | | | | | | |

| LINK CONTROL BLOCK | |
|---|---|
| LINK ID | LINK 1 |
| RELATED FILE | |
| SOURCE FILE | DESTINATION FILE |
| FILE 1 | FILE 2 |
| ACCESS RIGHTS OF USER 1 | |
| VISIBLE | OWNER |
| ON | |
| FILE CONTROL INFORMATION | |
| DELETE PROPAGTION FLAG | ON |
| LINK KIND | 1 |
| LINK CANCEL | 1 |

FILE DATA BLOCK

FIG. 14B

| FILE CONTROL BLOCK ||||||
|---|---|---|---|---|---|
| FILE NAME | FILE 2 |||||
| ACCESS RIGHTS OF USER 1 ||||||
| VISIBLE | READ | WRITE | COPY | DELETE | OWNER |
|  |  |  |  |  |  |

| LINK CONTROL BLOCK ||
|---|---|
| LINK ID | LINK 1 |
| RELATED FILE ||
| SOURCE FILE | DESTINATION FILE |
| FILE 1 | FILE 2 |
| ACCESS RIGHTS OF USER 1 ||
| VISIBLE | OWNER |
| ON |  |
| FILE CONTROL INFORMATION ||
| DELETE PROPAGTION FLAG | ON |
| LINK KIND | 1 |
| LINK CANCEL | 1 |

| FILE DATA BLOCK |
|---|
|  |

FIG. 15A

FILE CONTROL BLOCK

| FILE NAME | FILE 1 | | | | |
|---|---|---|---|---|---|
| ACCESS RIGHTS OF USER 1 | | | | | |
| VISIBLE | READ | WRITE | COPY | DELETE | OWNER |
| ON | ON | | | | |

LINK CONTROL BLOCK

| LINK ID | LINK 1 |
|---|---|
| RELATED FILE | |
| SOURCE FILE | DESTINATION FILE |
| FILE 1 | FILE 2 |

| ACCESS RIGHTS OF USER 1 | |
|---|---|
| VISIBLE | OWNER |
| ON | |

| FILE CONTROL INFORMATION | |
|---|---|
| DELETE PROPAGTION FLAG | ON |
| LINK KIND | 1 |
| LINK CANCEL | 1 |

FILE DATA BLOCK

FIG. 15B

| FILE CONTROL BLOCK | | | | | |
|---|---|---|---|---|---|
| FILE NAME | \multicolumn{5}{c|}{FILE 2} |

| FILE CONTROL BLOCK |
|---|
| FILE NAME : FILE 2 |

| ACCESS RIGHTS OF USER 1 | | | | | |
|---|---|---|---|---|---|
| VISIBLE | READ | WRITE | COPY | DELETE | OWNER |
|  |  |  |  |  |  |

| LINK CONTROL BLOCK |
|---|

| LINK ID | LINK 1 |
|---|---|

| RELATED FILE | |
|---|---|
| SOURCE FILE | DESTINATION FILE |
| FILE 1 | FILE 2 |

| ACCESS RIGHTS OF USER 1 | |
|---|---|
| VISIBLE | OWNER |
| ON |  |

| FILE CONTROL INFORMATION | |
|---|---|
| DELETE PROPAGTION FLAG | ON |
| LINK KIND | 1 |
| LINK CANCEL | 1 |

FILE DATA BLOCK

FIG.16A

| FILE CONTROL BLOCK | | | | | | |
|---|---|---|---|---|---|---|
| FILE NAME | FILE 1 | | | | | |
| ACCESS RIGHTS OF USER 1 | | | | | | |
| | VISIBLE | READ | WRITE | COPY | DELETE | OWNER |
| | ON | ON | ON | ON | ON | |

| LINK CONTROL BLOCK | |
|---|---|
| LINK ID | LINK 1 |
| RELATED FILE | |
| SOURCE FILE | DESTINATION FILE |
| FILE 1 | FILE 2 |
| ACCESS RIGHTS OF USER 1 | |
| VISIBLE | OWNER |
| | ON |
| FILE CONTROL INFORMATION | |
| DELETE PROPAGTION FLAG | ON |
| LINK KIND | 3 |
| LINK CANCEL | 1 |

FILE DATA BLOCK

FIG. 16B

| FILE CONTROL BLOCK | | | | | |
|---|---|---|---|---|---|
| FILE NAME | FILE 2 | | | | |
| ACCESS RIGHTS OF USER 2 | | | | | |
| VISIBLE | READ | WRITE | COPY | DELETE | OWNER |
| ON | ON | ON | ON | ON | |

| LINK CONTROL BLOCK | |
|---|---|
| LINK ID | LINK 1 |
| RELATED FILE | |
| SOURCE FILE | DESTINATION FILE |
| FILE 1 | FILE 2 |
| ACCESS RIGHTS OF USER 2 | |
| VISIBLE | OWNER |
|  | ON |
| FILE CONTROL INFORMATION | |
| DELETE PROPAGTION FLAG | ON |
| LINK KIND | 3 |
| LINK CANCEL | 1 |

| FILE DATA BLOCK |
|---|
| |

FIG. 17A

| FILE CONTROL BLOCK | | | | | | |
|---|---|---|---|---|---|---|
| FILE NAME | FILE 1 | | | | | |
| ACCESS RIGHTS OF USER 1 | | | | | | |
| | VISIBLE | READ | WRITE | COPY | DELETE | OWNER |
| | ON | ON | ON | ON | ON | |

| LINK CONTROL BLOCK | |
|---|---|
| LINK ID | LINK 1 |
| RELATED FILE | |
| SOURCE FILE | DESTINATION FILE |
| FILE 1 | FILE 2 |

| ACCESS RIGHTS OF USER 1 | |
|---|---|
| VISIBLE | OWNER |
| | ON |

| FILE CONTROL INFORMATION | |
|---|---|
| DELETE PROPAGTION FLAG | OFF |
| LINK KIND | 3 |
| LINK CANCEL | 1 |

FILE DATA BLOCK

FIG. 17B

| FILE CONTROL BLOCK | | | | | | |
|---|---|---|---|---|---|---|
| FILE NAME | FILE 2 | | | | | |
| ACCESS RIGHTS OF USER 1 | | | | | | |
| | VISIBLE | READ | WRITE | COPY | DELETE | OWNER |
| | ON | ON | ON | ON | ON | |

| LINK CONTROL BLOCK | | |
|---|---|---|
| LINK ID | LINK 1 | |
| RELATED FILE | | |
| | SOURCE FILE | DESTINATION FILE |
| | FILE 1 | FILE 2 |
| ACCESS RIGHTS OF USER 1 | | |
| | VISIBLE | OWNER |
| | | ON |
| FILE CONTROL | | |
| | DELETE PROPAGTION FLAG | OFF |
| | LINK KIND | 3 |
| | LINK CANCEL | 1 |

FILE DATA BLOCK

FIG. 18A

| FILE CONTROL BLOCK | | | | | | |
|---|---|---|---|---|---|---|
| FILE NAME | \multicolumn{6}{l|}{FILE 1} |
| ACCESS RIGHTS OF USER 1 | | | | | | |
| | VISIBLE | READ | WRITE | COPY | DELETE | OWNER |
| | ON | ON | ON | ON | ON | |

| LINK CONTROL BLOCK | | |
|---|---|---|
| LINK ID | \multicolumn{2}{l|}{LINK 1} |
| RELATED FILE | | |
| | SOURCE FILE | DESTINATION FILE |
| | FILE 1 | FILE 2 |
| ACCESS RIGHTS OF USER 1 | | |
| | VISIBLE | OWNER |
| | | ON |
| FILE CONTROL INFORMATION | | |
| | DELETE PROPAGTION FLAG | OFF |
| | LINK KIND | 3 |
| | LINK CANCEL | 2 |

| FILE DATA BLOCK |
|---|
| |

FIG. 18B

FILE CONTROL BLOCK

| FILE NAME | FILE 2 |
|---|---|

ACCESS RIGHTS OF USER 1

| VISIBLE | READ | WRITE | COPY | DELETE | OWNER |
|---|---|---|---|---|---|
| ON | ON | ON | ON | ON | |

LINK CONTROL BLOCK

| LINK ID | LINK 1 |
|---|---|

RELATED FILE

| SOURCE FILE | DESTINATION FILE |
|---|---|
| FILE 1 | FILE 2 |

ACCESS RIGHTS OF USER 1

| VISIBLE | OWNER |
|---|---|
| | ON |

FILE CONTROL INFORMATION

| DELETE PROPAGTION FLAG | OFF |
|---|---|
| LINK KIND | 3 |
| LINK CANCEL | 2 |

FILE DATA BLOCK

FIG. 19A

| FILE CONTROL BLOCK | | | | | | |
|---|---|---|---|---|---|---|
| FILE NAME | | FILE 1 | | | | |
| ACCESS RIGHTS OF USER 1 | | | | | | |
| | VISIBLE | READ | WRITE | COPY | DELETE | OWNER |
| | | | | | | ON |
| ACCESS RIGHTS OF USER 3 | | | | | | |
| | VISIBLE | READ | WRITE | COPY | DELETE | OWNER |
| | | | | | OFF | |

| LINK CONTROL BLOCK | | | | | | |
|---|---|---|---|---|---|---|
| LINK ID | | LINK 1 | | | | |
| RELATED FILE | | | | | | |
| | SOURCE FILE | | | DESTINATION FILE | | |
| | FILE 1 | | | FILE 2 | | |
| ACCESS RIGHTS OF USER 1 | | | | | | |
| | VISIBLE | | | OWNER | | |
| | | | | ON | | |
| FILE CONTROL INFORMATION | | | | | | |
| | DELETE PROPAGTION FLAG | | ON | | | |
| | LINK KIND | | 1 | | | |
| | LINK CANCELL | | 1 | | | |
| ACCESS RIGHT INCREASE PROPAGATION FLAG | | | | | | |
| | VISIBLE | READ | WRITE | COPY | DELETE | OWNER |
| | | | | | ON | |
| ACCESS RIGHT DECREASE PROPAGATION FLAG | | | | | | |
| | VISIBLE | READ | WRITE | COPY | DELETE | OWNER |
| | | | | | | |

| FILE DATA BLOCK |
|---|

FIG. 19B

FILE CONTROL BLOCK

| FILE NAME | FILE 2 | | | | |
|---|---|---|---|---|---|
| ACCESS RIGHTS OF USER 2 | | | | | |
| VISIBLE | READ | WRITE | COPY | DELETE | OWNER |
|  |  |  |  |  | ON |
| ACCESS RIGHTS OF USER 3 | | | | | |
| VISIBLE | READ | WRITE | COPY | DELETE | OWNER |
|  |  |  |  | OFF |  |

LINK CONTROL BLOCK

| LINK ID | LINK 1 |
|---|---|
| RELATED FILE | |
| SOURCE FILE | DESTINATION FILE |
| FILE 1 | FILE 2 |

ACCESS RIGHTS OF USER 2

| VISIBLE | OWNER |
|---|---|
|  | ON |

FILE CONTROL INFORMATION

| DELETE PROPAGTION FLAG | ON |
|---|---|
| LINK KIND | 1 |
| LINK CANCELL | 1 |

ACCESS RIGHT INCREASE PROPAGATION FLAGS

| VISIBLE | READ | WRITE | COPY | DELETE | OWNER |
|---|---|---|---|---|---|
|  |  |  |  | ON |  |

ACCESS RIGHT DECREASE PROPAGATION FLAGS

| VISIBLE | READ | WRITE | COPY | DELETE | OWNER |
|---|---|---|---|---|---|
|  |  |  |  |  |  |

FILE DATA BLOCK

FIG. 20A

| FILE CONTROL BLOCK | | | | | |
|---|---|---|---|---|---|
| FILE NAME | | FILE 1 | | | |
| ACCESS RIGHTS OF USER 1 | | | | | |
| VISIBLE | READ | WRITE | COPY | DELETE | OWNER |
| | | | | | ON |
| ACCESS RIGHTS OF USER 3 | | | | | |
| VISIBLE | READ | WRITE | COPY | DELETE | OWNER |
| | | | | ON | |

| LINK CONTROL BLOCK | | | | | |
|---|---|---|---|---|---|
| LINK ID | | LINK 1 | | | |
| RELATED FILE | | | | | |
| SOURCE FILE | | DESTINATION FILE | | | |
| FILE 1 | | FILE 2 | | | |
| ACCESS RIGHTS OF USER 2 | | | | | |
| VISIBLE | | OWNER | | | |
| | | ON | | | |
| FILE CONTROL | | | | | |
| DELETE PROPAGTION FLAG | | ON | | | |
| LINK KIND | | 1 | | | |
| LINK CANCELL | | 1 | | | |
| ACCESS RIGHT INCREASE | | | | | |
| VISIBLE | READ | WRITE | COPY | DELETE | OWNER |
| | | | | ON | |
| ACCESS RIGHT DECREASE | | | | | |
| VISIBLE | READ | WRITE | COPY | DELETE | OWNER |
| | | | | | |

FILE DATA BLOCK

FIG. 20B

FILE CONTROL BLOCK

| FILE NAME | FILE 2 | | | | |
|---|---|---|---|---|---|
| ACCESS RIGHTS OF USER 1 | | | | | |
| VISIBLE | READ | WRITE | COPY | DELETE | OWNER |
|  |  |  |  |  | ON |
| ACCESS RIGHTS OF USER 3 | | | | | |
| VISIBLE | READ | WRITE | COPY | DELETE | OWNER |
|  |  |  |  | ON |  |

LINK CONTROL BLOCK

| LINK ID | LINK 1 |
|---|---|
| RELATED FILE | |
| SOURCE FILE | DESTINATION FILE |
| FILE 1 | FILE 2 |

ACCESS RIGHTS OF USER 2

| VISIBLE | OWNER |
|---|---|
|  | ON |

FILE CONTROL INFORMATION

| DELETE PROPAGTION FLAG | ON |
|---|---|
| LINK KIND | 1 |
| LINK CANCELL | 1 |

ACCESS RIGHT INCREASE PROPAGATION FLAGS

| VISIBLE | READ | WRITE | COPY | DELETE | OWNER |
|---|---|---|---|---|---|
|  |  |  |  | ON |  |

ACCESS RIGHT DECREASE PROPAGATION FLAGS

| VISIBLE | READ | WRITE | COPY | DELETE | OWNER |
|---|---|---|---|---|---|
|  |  |  |  |  |  |

FILE DATA BLOCK

FIG. 21A

| FILE CONTROL BLOCK | | | | | |
|---|---|---|---|---|---|
| FILE NAME | | FILE 2 | | | |
| ACCESS RIGHTS OF USER 1 | | | | | |
| VISIBLE | READ | WRITE | COPY | DELETE | OWNER |
|  |  |  |  |  | ON |
| ACCESS RIGHTS OF USER 3 | | | | | |
| VISIBLE | READ | WRITE | COPY | DELETE | OWNER |
|  |  |  |  | ON |  |

| LINK CONTROL BLOCK | | | | | |
|---|---|---|---|---|---|
| LINK ID | | LINK 1 | | | |
| RELATED FILE | | | | | |
| SOURCE FILE | | DESTINATION FILE | | | |
| FILE 1 | | FILE 2 | | | |
| ACCESS RIGHTS OF USER 2 | | | | | |
| VISIBLE | | OWNER | | | |
|  | | ON | | | |
| FILE CONTROL INFORMATION | | | | | |
| DELETE PROPAGTION FLAG | | ON | | | |
| LINK KIND | | 1 | | | |
| LINK CANCELL | | 1 | | | |
| ACCESS RIGHT INCREASE PROPAGATION FLAGS | | | | | |
| VISIBLE | READ | WRITE | COPY | DELETE | OWNER |
|  |  |  |  |  |  |
| ACCESS RIGHT DECREASE PROPAGATION FLAGS | | | | | |
| VISIBLE | READ | WRITE | COPY | DELETE | OWNER |
|  |  |  |  | ON |  |

FILE DATA BLOCK

FIG. 21B

| FILE CONTROL BLOCK | | | | | | |
|---|---|---|---|---|---|---|
| FILE NAME | FILE 2 | | | | | |
| ACCESS RIGHTS OF USER 1 | | | | | | |
| | VISIBLE | READ | WRITE | COPY | DELETE | OWNER |
| | | | | | | ON |
| ACCESS RIGHTS OF USER 3 | | | | | | |
| | VISIBLE | READ | WRITE | COPY | DELETE | OWNER |
| | | | | | ON | |

| LINK CONTROL BLOCK | | | | | | |
|---|---|---|---|---|---|---|
| LINK ID | LINK 1 | | | | | |
| RELATED FILE | | | | | | |
| | SOURCE FILE | | DESTINATION FILE | | | |
| | FILE 1 | | FILE 2 | | | |
| ACCESS RIGHTS OF USER 2 | | | | | | |
| | VISIBLE | | OWNER | | | |
| | | | ON | | | |
| FILE CONTROL INFORMATION | | | | | | |
| | DELETE PROPAGATION FLAG | | ON | | | |
| | LINK KIND | | 1 | | | |
| | LINK CANCELL | | 1 | | | |
| ACCESS RIGHT INCREASE PROPAGATION FLAGS | | | | | | |
| | VISIBLE | READ | WRITE | COPY | DELETE | OWNER |
| | | | | | | |
| ACCESS RIGHT DECREASE PROPAGATION FLAGS | | | | | | |
| | VISIBLE | READ | WRITE | COPY | DELETE | OWNER |
| | | | | | ON | |

FILE DATA BLOCK

FIG. 22A

FILE CONTROL BLOCK

| FILE NAME | FILE 1 | | | | |
|---|---|---|---|---|---|
| ACCESS RIGHTS OF USER 1 | | | | | |
| VISIBLE | READ | WRITE | COPY | DELETE | OWNER |
| | | | | | ON |
| ACCESS RIGHTS OF USER 3 | | | | | |
| VISIBLE | READ | WRITE | COPY | DELETE | OWNER |
| | | | | OFF | |

LINK CONTROL BLOCK

| LINKID | LINK 1 |
|---|---|
| RELATED FILE | |

| SOURCE FILE | DESTINATION FILE |
|---|---|
| FILE 1 | FILE 2 |

| ACCESS RIGHTS OF USER 2 | |
|---|---|
| VISIBLE | OWNER |
| | ON |

FILE CONTROL INFORMATION

| DELETE PROPAGTION FLAG | ON |
|---|---|
| LINK KIND | 1 |
| LINK CANCELL | 1 |

ACCESS RIGHT INCREASE PROPAGATION FLAGS

| VISIBLE | READ | WRITE | COPY | DELETE | OWNER |
|---|---|---|---|---|---|
| | | | | | |

ACCESS RIGHT DECREASE PROPAGATION FLAGS

| VISIBLE | READ | WRITE | COPY | DELETE | OWNER |
|---|---|---|---|---|---|
| | | | | ON | |

FILE DATA BLOCK

FIG. 22B

| FILE CONTROL BLOCK | | | | | |
|---|---|---|---|---|---|
| FILE NAME | | FILE 2 | | | |
| ACCESS RIGHTS OF USER 1 | | | | | |
| VISIBLE | READ | WRITE | COPY | DELETE | OWNER |
|  |  |  |  |  | ON |
| ACCESS RIGHTS OF USER 3 | | | | | |
| VISIBLE | READ | WRITE | COPY | DELETE | OWNER |
|  |  |  |  | OFF |  |

| LINK CONTROL BLOCK | | | | | |
|---|---|---|---|---|---|
| LINK ID | | LINK 1 | | | |
| RELATED FILE | | | | | |
| SOURCE FILE | | DESTINATION FILE | | | |
| FILE 1 | | FILE 2 | | | |
| ACCESS RIGHTS OF USER 2 | | | | | |
| VISIBLE | | OWNER | | | |
|  | | ON | | | |
| FILE CONTROL INFORMATION | | | | | |
| DELETE PROPAGTION FLAG | | ON | | | |
| LINK KIND | | 1 | | | |
| LINK CANCELL | | 1 | | | |
| ACCESS RIGHT INCREASE PROPAGATION FLAGS | | | | | |
| VISIBLE | READ | WRITE | COPY | DELETE | OWNER |
|  |  |  |  |  |  |
| ACCESS RIGHT DECREASE PROPAGATION FLAGS | | | | | |
| VISIBLE | READ | WRITE | COPY | DELETE | OWNER |
|  |  |  |  | ON |  |

FILE DATA BLOCK (SOURCE FILE)                (DESTINATION FILE)

(SOURCE FILE)                (DESTINATION FILE)

FILE MANAGING SYSTEM FOR MANAGING FILES SHARED WITH A PLURALITY OF USERS

BACKGROUND OF THE INVENTION

1) Field of the Invention

The present invention generally relates to a file managing system for managing files which are shared with a plurality of users and, more particularly, to a file managing system having file linking information as file managing information for each of the files, the link information being used for linking a plurality of files.

2) Description of the Related Art

A file managing system has been suggested which manages files shared with a plurality of users. In such a system, each of the users can access a file stored in a file server through an end terminal. The file server controls access of the users to a file in accordance with prescribed managing information. That is, the file server controls permission for reading, writing, copying and deleting of a file stored in the file server.

Additionally, a managing method has been suggested for the above-mentioned file managing system to manage a plurality of files by relating the files to each other by a link. Link information defines a relationship between a plurality of files. The link information in the conventional file managing system is managed together with the related file and, thus, each user who may access a file linked to other files can recognize the presence of the link.

In the above mentioned method, if one user establishes a particular link for a file, the particular link must be shared with other users. That is, different links cannot be established for one file. Accordingly, users cannot manage files by using their own specific link in the conventional managing system.

The conventional link information merely indicates the fact that a file is linked to other files, and it does not provide a control function for the linked files. That is, in the conventional file managing system, control files in accordance with a link established between the files is not considered.

SUMMARY OF THE INVENTION

It is a general object of the present invention to provide an improved and useful file managing system in which the above mentioned disadvantages are eliminated.

A more specific object of the present invention is to provide a file managing system in which users can independently establish their own links between files.

Another object of the present invention is to provide a file managing system in which a file linked to other files can be controlled in accordance with link information.

In order to achieve the above mentioned objects, there is provided a file managing system for managing a plurality of files being accessed by a plurality of users, the plurality of files including a first file and a second file linked to the first file by a link which relates the first file to the second file, the file managing system comprising:

first means for defining file controlling information which is provided to the files and represents a status of rights given to each of the users to operate the files, each of users being permitted to perform a processing which corresponds to one of the rights the status of which is in an on-state, the file controlling information being produced for each of the files;

second means for defining link controlling information for operations for the files and the link, the link controlling information including link information representing a condition of the link between the first file and the second file, the link controlling information further including information which represents whether each of the users is permitted to use the link, the link controlling information being produced for each of the files; and first controlling means for controlling access of each of the users to the files and access of each of users to the link in accordance with the file controlling information and the link controlling information.

According to the above-mentioned invention, some operations of the files are automatically performed in accordance with the file controlling information, and a use of the link is permitted in accordance with the link controlling information. Thus, access to the files and use of the link is controlled by each user separately. Accordingly, each of the users can independently manage the files linked to each other in their own manner.

Additionally, in the above-mentioned file managing system, the link controlling information may further include first propagation information which represents whether a processing performed on the first file is to be reflected to the second file, and the first controlling means may further comprise fourth controlling means for controlling a processing performed on the second file, when the first file is processed, in accordance with the first propagation information.

Since the second file is operated in accordance with the first propagation information which represents whether an operation performed on the first file is to be reflected to the second file, the file control information of the second file can be automatically changed through the link which links the first file to the second file when the file control information of the first file is changed.

Other objects, features and advantages of the present invention will become more apparent from the following detailed description when read in conjunction with the accompanying drawings.

BRIEF DESCRIPTION OF THE DRAWINGS

FIG. 1 is a block diagram showing the basic structure of a file system to which a file managing system according to the present invention is applied;

FIG. 2 is a block diagram of a file server shown in FIG. 1;

FIG. 3A is an illustration for explaining a structure of a file control block of a file shown in FIG. 2; FIG. 3B is an illustration for explaining the structure of a link control block of the file shown in FIG. 2; FIG. 3C is an illustration for explaining a data block of the file shown in FIG. 2;

FIG. 5A is an illustration for explaining information stored in an access right increase propagation field; FIG. 5B is an illustration for explaining information stored in access right decrease propagation flags;

FIG. 6 is an illustration for explaining the kinds of link;

FIG. 7A is an illustration for explaining information stored in a link cancel field; FIG. 7B is an illustration for explaining the link cancel Value and link canceling method;

FIG. 9 is an illustration for explaining an example of link management information for links shown in FIG. 8;

FIG. 10 is an illustration for explaining another example of link management information for the links shown in FIG. 8;

FIG. 12 is an illustration for explaining an example of link management information for a link shown in FIG. 11;

FIG. 13 is an illustration for explaining an example of link management information for a link shown in FIG. 11;

FIGS. 14A and 14B are illustrations for explaining structures of two files when the two files are linked to each other by a link;

FIGS. 15A and 15B are illustrations for explaining structures of two files when the two files are linked to each other by a link;

FIGS. 16A and 16B are illustrations for explaining structures of two files when the two files are linked to each other by a link;

FIGS. 17A and 17B are illustrations for explaining structures of two files when the two files are linked to each other by a link;

FIGS. 18A and 18B are illustrations for explaining structures of two files when the two files are linked to each other by a link;

FIGS. 19A and 19B are illustrations for explaining structures of two files when the two files are linked to each other by a link;

FIGS. 20A and 20B are illustrations for explaining structures of two files when the two files are linked to each other by a link;

FIGS. 21A and 21B are illustrations for explaining structures of two files when the two files are linked to each other by a link;

FIGS. 22A and 22B are illustrations for explaining structures of two files when the two files are linked to each other by a link;

DETAILED DESCRIPTION OF THE PREFERRED EMBODIMENT

Figure 4:
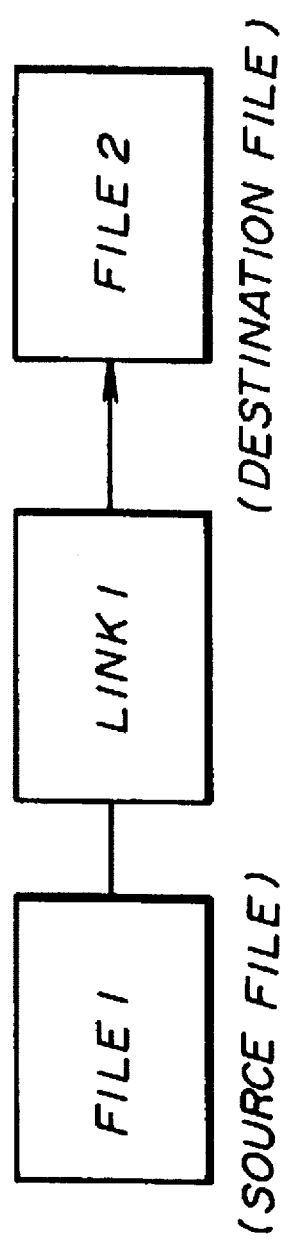
FIG. 4 is an illustration for explaining a relationship between a file and a link.

A description will now be given of an embodiment according to the present invention. FIG. 1 is a block diagram showing a basic structure of a file system to which a file managing system according to the present invention is applied.

In the file system shown in FIG. 1, a plurality of end terminal units 21(1), 21(2), . . . , 21(n) are connected to a file server 10 via a network 50 such as a local area network (LAN). Each of the end terminal units 21(1), 21(2), . . . , 21(n) comprises a personal computer. A large-scale computer or a work station is used for the file server 10. A user can use a file in the file server 10 by logging in through one of the end terminal units 21(1), 21(2), . . . , 21(n).

The file server 10 comprises a control unit 12 and a file storing unit 14 as shown in FIG. 2. The control unit 12 comprises a central processing unit (CPU) and a memory. The file storing unit 14 comprises a data storing apparatus such as a hard disk unit or a magneto-optical disk unit.

The file storing unit 14 stores information of a file management table 141 together with a file 1, a file 2, . . . and a file n. The plurality of files 1 to n include linked files. The file storing unit 141 includes a file ID management table 141a for managing an identification (corresponds to a file name) of each file. Each of the files 1 to n is generally divided into a control block and a data block. The data block corresponds to contents of the file such as text data or image data. The control block is further divided into a file control block and a link control block. The file control block corresponds to information for managing the file. The link control block corresponds to information for managing the link. The structure of each file will be described later.

The control unit 12 comprises a transaction control unit 121 and a file operation control unit 122. The file transaction control unit 121 receives all requests for operating files input by users who logged in through the end terminal units 21(1), 21(2), . . . , 21(n). The file operation control unit 122 processes the file in accordance with the request received by the transaction control unit 121. The transaction control unit 121 sends the result of the processing obtained by the file operation control unit 122 to the corresponding end terminal units 21(1), 21(2), . . . , 21(n).

The file operation control unit 122 comprises a central control unit 123, an access right control unit 124, a link data control unit 125 and a file data control unit 126. The central control unit 123 selectively controls the access right control unit 124, the link data control unit 125 and the file data control unit 126 in accordance with the contents of each request. The access right control unit 124 checks the access right on the file and the link provided to each user, and changes the status of the access right if necessary. The access right on the file and the link will be described later. The link data control unit 125 updates information for controlling the link, and controls the link and/or the file in accordance with the information for controlling the link. The file data control unit 126 reads and writes the file data.

A structure of each file stored in the file storing unit 14 is shown in FIGS. 3A, 3B and 3C. FIG. 3A shows a structure of the file control block. The file control block stores information for managing a file such as a file access right of each user, a file name and a file creator. The file access right is a right which is given to and executed by each user for operating a file. The file access right consists of a visible right, a reading right, a writing right, a copying right, a deleting right and an owner right. The visible right is a right for observing the existence of a file. The reading right is a right for reading a file. The writing right is a right for updating data of a file. The copying right is a right for copying a file as a new file. The deleting right is a right for deleting a file from the system. The owner right is a right for updating information for managing a file. In the file control block, the status of each of the above-mentioned rights belonging to each user is represented by a state (on or off) of a corresponding flag.

FIG. 3B shows a structure of the link control block. The link control block stores information for managing a link such as a link ID, a related link list, a link access right and file control information. The link ID designates a link which relates files. Each link ID is produced to be globally unique in the entire system so that one link ID corresponds to only one link. The link access right is a right which can be executed by each user on a link. The link access right includes a visible right and an owner right. The visible right for a link is a right for observing the existence of a link to check the contents of the link. The owner right is a right for updating information for managing a link. The file control information is provided for controlling files through a link. The status of each of the above-mentioned rights on a link belonging to each user is represented by a state (on or off) of a corresponding flag.

The data block follows the file control block and the link control block as shown in FIG. 3C. The data block stores main contents of a file such as text data or image data.

The file control information stored in the link control block is information for controlling, for example, a file 1 and a file 2 which are linked by a link 1 to each other as shown in FIG. 4. The file control information is defined as an attribute of the link 1. The file 1 which is an origin of the link 1 is referred to as a source file. The file 2 which is linked to the file 1 through the link 1 is referred to as a destination file. The file control information of the destination file is the same as that of the source file.

A field for the file control information in the link control block comprises, as shown in FIG. 3B, an access right increase propagation flag, an access right decrease propagation flag, a delete propagation flag, a link kind field and a link cancel field. Six flags corresponding to the six rights (the visible right, the reading right, the writing right, the copying right, the deleting right and the owner right) on a file are provided in the access right increase propagation field as shown in FIG. 5A. A flag, which is turned on, among the six flags of the source file becomes control information for transmitting a change in the status of the flag to the destination file. That is, a flag of the destination file which corresponds to the flag of the source file, which was turned on, is automatically changed from an off-state to an on-state in accordance with the control information. The access right corresponding to the flag which is in the on-state is given to a user. Accordingly, the number of rights in the access right on the destination file, which rights can be executed by a user, is increased.

Six flags corresponding to the six rights (the visible right, the reading right, the writing right, the copying right, the deleting right and the owner right) on a file are also provided in the access right decrease propagation filed as shown in FIG. 5B. A flag, which is turned on, among the six flags of the source file becomes control information for transmitting a change in the status of the flag to the destination file. That is, a flag of the destination file which corresponds to the flag of the source file, which was turned off, is automatically changed from an on-state to an off-state in accordance with the control information. The access right corresponding to the flag which is in the off-state is given to a user. Accordingly, the number of rights in the access right on the destination file, which rights can be executed by a user, is decreased.

Information (a link kind value) for representing the kind of link which links the source file to the destination file is stored in the link kind field. The relationship between the link kind and the link kind value is shown in FIG. 6. When the link kind value is "1", this indicates that the relationship between the files linked to each other is a memo-link. The memo-link links one source file to one destination file like a parent-child relationship. This corresponds to a relationship between a document (source file) and a memo (destination file) attached onto the document. When the link kind value is "2", this indicates that the relationship between files linked to each other is a staple-link. The staple-link links one source file to a plurality of destination files like a parent-children relationship. In this case, a source file is a parent and a plurality of files are children. Additionally, an order is given to the destination files. This corresponds to a relationship between a cover page (source file) of a document having a plurality of pages and succeeding pages (destination files) of the document. When the link kind value is 3, this indicates that the relationship between files linked to each other is a reference-link which corresponds to a relationship other than that of the memo-link or the staple-link.

As shown in FIG. 7A, a source file, a destination file and an integer (link cancel value) for designating one of the methods for canceling the link are stored in the link cancel field. The link cancel value designates a kind of link canceling method as shown in a table of FIG. 7B. That is, in the link canceling method designated by the link cancel value of "1", the link is canceled when the source file is deleted. In the link canceling method designated by the link cancel value of "2", the link is canceled when the source file is deleted or the destination file is deleted.

A flag indicating whether or not the deletion of the source file is transmitted to the destination file is set in the delete propagation flag. When the source file is deleted while the flag is set to the on-state, the destination file is automatically deleted.

Figure 8:
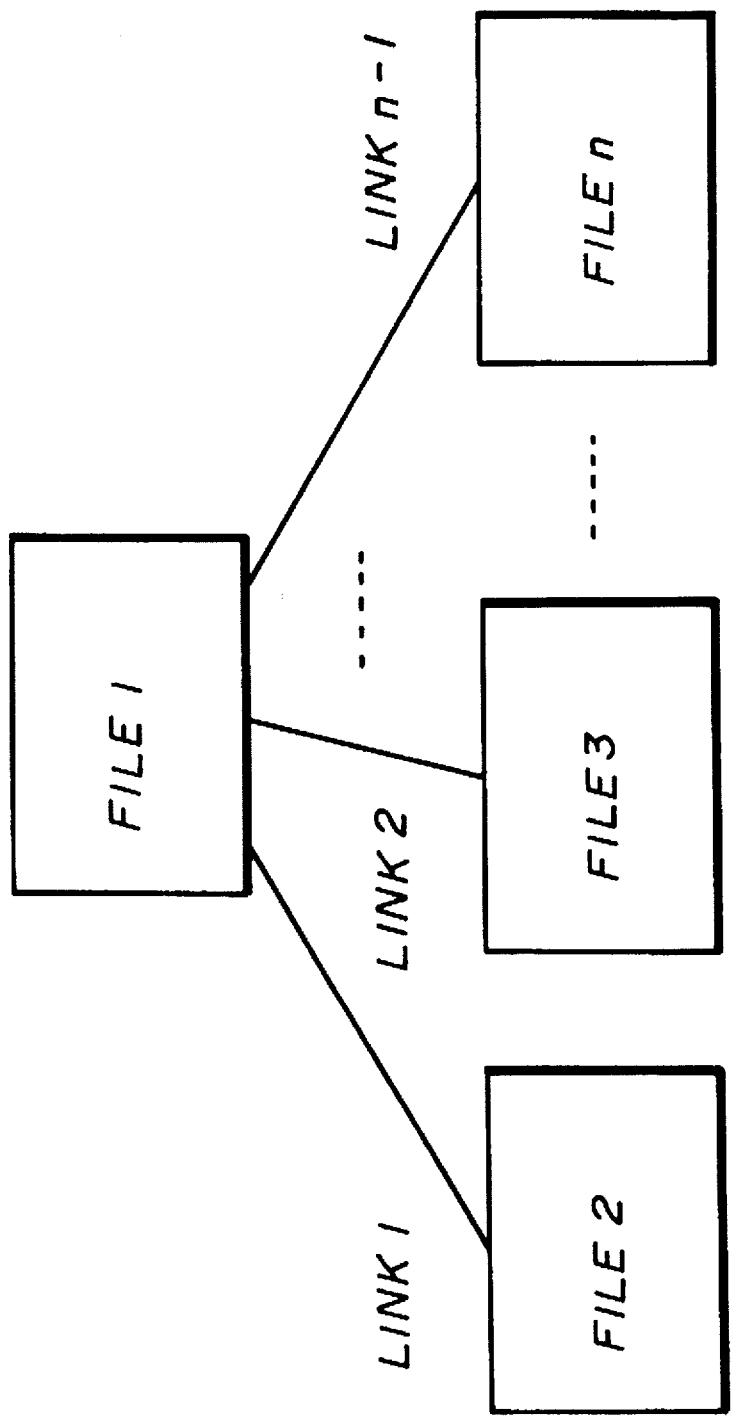
FIG. 8 is an illustration for explaining a relationship between files and links.

For example, as shown in FIG. 8, when the file 1, file 2, . . . , file n are linked by the link 1, link 2, . . . , link n−1, respectively, link management information shown in FIG. 9 or 10 is set in the link control block.

FIG. 9 shows the management information of link 1 which links the file 1 (source file) to the file 2 (destination file). Managing information for fields other than the fields shown in FIG. 9 may be arbitrarily set. The type of link (link kind) is the staple-link "2" (refer to FIG. 6). That is, the link 1 is related with the link2, link 3, . . . , link n−1. Since the flag of the delete propagation flag is set in the off-state, the file 2 is not deleted when the file 1 is deleted. Additionally, since the link cancel value is set to "2" in the link cancel field, the link 1 is canceled when either the file 1 or the file 2 is deleted.

FIG. 10 shows the management information of link m (m=1, . . . , n−1) which links the file 1 (source file) to the file m+1 (destination file). Managing information for fields other than the fields shown in FIG. 10 may be arbitrarily set. The type of link m is the staple-link "2" (refer to FIG. 6). The information in the delete propagation flag and the link cancel field is the same as that of FIG. 9.

Figure 11:
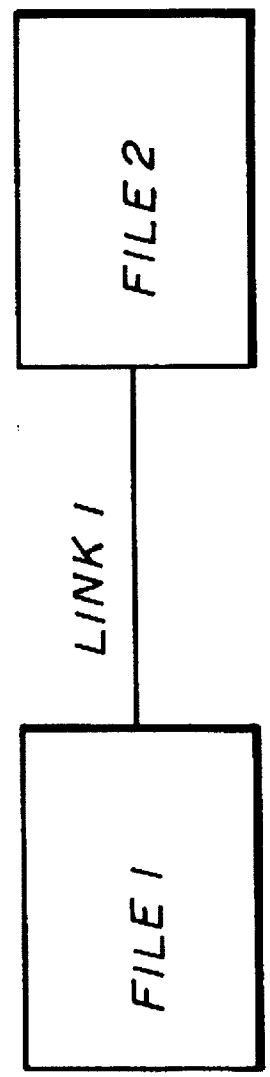
FIG. 11 is an illustration for explaining a file and a link.

When the file 1 is linked to the file 2 by the link 1 as shown in FIG. 11, link management information as shown in FIG. 12 or 13 is set in the link control block of each of the files 1 and 2. Management information for fields other than that of the related files as shown in FIGS. 12 and 13 may be arbitrarily set.

In FIG. 12, the type of link (link kind) is the memo-link "1" (refer to FIG. 6). That is, the file 1 (source file) is linked to the file 2 (destination file) by the memo-link. All flags corresponding to the access rights set in the access right increase propagation flag are set to the on-state. All flags corresponding to the access rights set in the access right decrease propagation flag are also set to the on-state except for the deleting right which is set to the off-state. Accordingly, if each of the flags (access rights) set for the file 1 is changed in its status, each of the corresponding rights for the file 2 is automatically changed with the exception that the flag for the deleting right remains the same. Since a flag in the delete propagation is set to the on-state, the destination file (file 2) is deleted when the source file (file 1) is deleted. Additionally, since the link cancel value in the link cancel field is set to 1, the link 1 is canceled when the source file (file 1) is deleted.

In FIG. 13, the type of link (link kind) is the reference-link "3" (refer to FIG. 6). That is, the file 1 (source file) is linked to the file 2 (destination file) by the reference-link which is other than the memo-link or the staple-link. In this case, since the flag in the delete propagation flag is set to the off-state, the file 2 is not automatically deleted when the file 1 is deleted. The link cancel value is set to "1", the same as that of FIG. 12.

A description will now be given of processes performed in the above-mentioned file managing system. When a user logs in through the end terminal unit 21 (1), the ID information and the log-in information of the user are sent to the file server 10 via the network 50. The file server 10 then accepts an operation request from the user.

For example, when the user transfers a new file which comprises, for example, text data, to the file server 10 through the-end terminal unit 21(1), the new file is stored in the file storing unit 14 of the file server 10 by the file data control unit 126. At this time, the file ID of the new file is added to the file ID management table. When the user who produced the new file transfers the information on the access rights with respect to the new file from the end terminal unit 21(1) to the file server 10, the access right control unit 124 of the file server 10 sets a status of each of the flags in the file control block of the new file in accordance with the transferred information.

When another user who logged in through the end terminal unit 21(2) accesses a file stored in the file server 10 which file was produced in accordance with the above-mentioned procedure, the access right control unit 124 determines whether the access to file can be accepted by referring to the access rights set in the file control block of the file. If the access is acceptable, the file data control unit 124 reads data of the file, and the data is transferred from the file server 10 to the end terminal unit 21(2) via the network unit 50. The user then works on the file at the end terminal unit 21(2) in accordance with the corresponding access right.

For example, the user having the visible right on the file 1 and file 2 can create a link which links the file 1 to the file 2. That is, the management information for managing the file is input through one of the end terminal units, the management information is transferred to the file server 10 via the network 50. In the file server 10, the link data control unit 125 writes the management information in the field of the link control block of each of the files 1 and 2. The management information includes, as previously mentioned, the information of link ID, related link list, access rights given to the user, a status of the access right increase propagation and the access right decrease propagation, link kind, source file, destination file, and information for canceling the link (refer to FIG. 3).

The file and the link stored in the file server 10 is managed in accordance with the file control information and the link control information stored in the file storing unit 14 together with the data block which stores the contents of the file by the following method, for example.

On the assumption that the file 1 is linked to the file 2 by the link 1, and the file 1 is defined as shown in FIG. 14A and the file 2 is defined as shown in FIG. 14B, the user 1 is able to recognize the presence of the file 1 by the visible right on the file 1. That is, when the user 1, who has the visible right on the file 1, requests to the file server 10 the file list of the system, the file server 10 sends the file list including the file 1 to the end terminal unit 21(1) in accordance with the determination made by the access right control unit 124. The file list is displayed on a display unit of the end terminal unit 21(1), for example.

Figure 23:
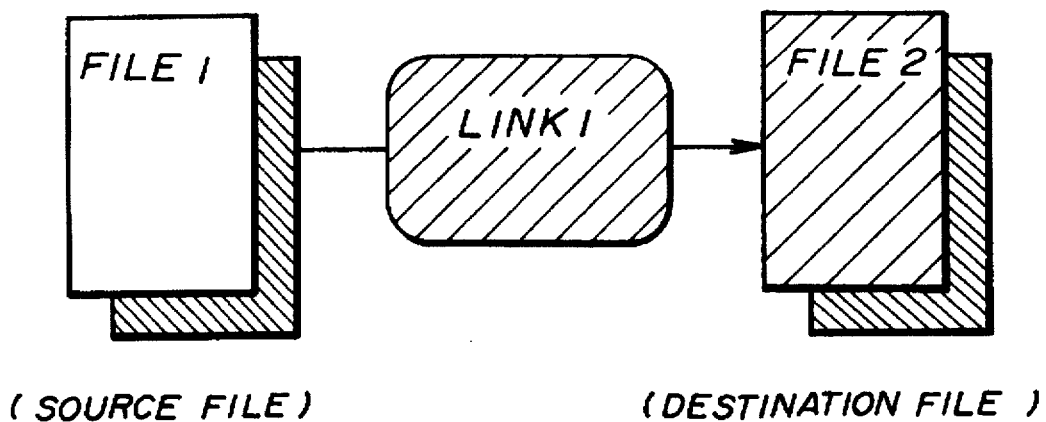
FIG. 23 is an illustration for explaining a relationship between a file and a link.

However, in this case, since the user 1 does not have the reading right on the file 1, if a request for reading the file 1 is made by the user 1, the file server 10 sends back a response for rejection to the end terminal unit 21(1). Accordingly, the user 1 who does not have the visible right on the link 1 cannot recognize the presence of the link 1 of which the source file is the file 1 as shown in FIG. 23.

On the assumption that the file 1 is linked to the file 2 by the link 1, and the file 1 is defined as shown in FIG. 15A and the file 2 is defined as shown in FIG. 15B, the user 1 is able to retrieve the file 1 from the file server 10 to the end terminal unit 21(1) in accordance with the reading right on the file 1. That is, when the user 1, who has the reading right on the file 1, requests for reading the file 1 to the file server 10, the file data control unit 126 reads the file data stored in the data block field of the file 1 in accordance with the determination made by the access right control unit 124. The file data is transferred to the end terminal unit 21(1), and displayed on the display unit, for example.

Additionally, the user 1 is able to observe the presence of the link 1 which is a source file by using the visible right on the file 1. That is, when the user 1 requests the list of links, which link the file 1 to other files, to the file server 10, the file server sends the link list including the link 1 (link ID) to the end terminal unit 21(1) in accordance with the result of determination by the access right control unit 124. The link list is displayed on the display of the end terminal unit 21(1).

Figure 24:
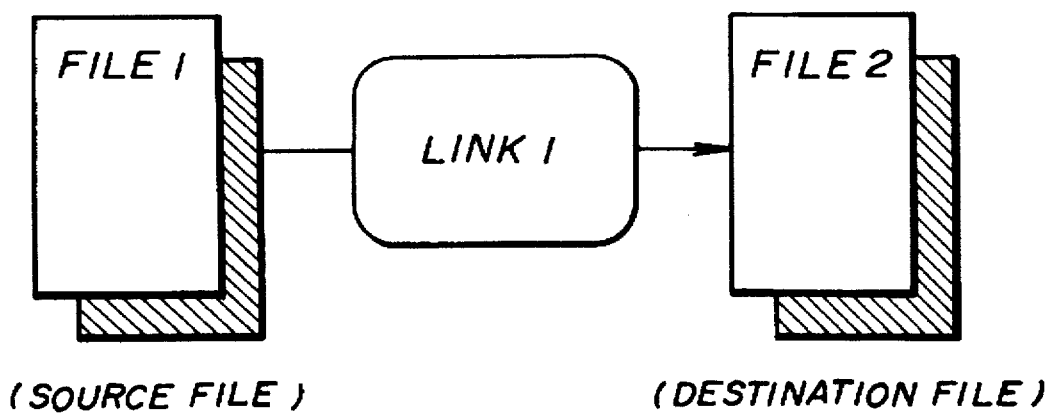
FIG. 24 is an illustration for explaining a relationship between a file and a link.

In the present case, the user 1 is able to observe the contents of the file 1 and, additionally, to recognize the presence of the file 2 which is linked to the file 1 by the link 1 as shown in FIG. 24.

On the assumption that the file 1 is linked to the file 2 by the link 1, and the file 1 is defined as shown in FIG. 16A and the file 2 is defined as shown in FIG. 16B, the user 1 is able to delete the file 1 from the file server 10 in accordance with the deleting right on the file 1. That is, when the user 1, who has the deleting right on the file 1, requests deletion of the file 1 to the file server 10, the control unit 12 deletes the file 1 from the file data storing unit 14 in accordance with the determination made by the access right control unit 124.

When the request for deleting the file 1 is made to the file server 10 as mentioned above, the link data control unit 125 checks the management information for the file 1. If it is detected that the flag in the delete propagation flag is in the on-state as shown in FIG. 16A, the control unit 12 will delete the file 2 from the file storing unit 14. This deleting operation is performed on the basis of the rights of the user 2 who has a right to possess the link 1 regardless of which user has the deleting right on the file 2.

Additionally, the link data control unit 125 recognizes that the link cancel value in the link cancel field is set to "1". Accordingly, the control unit 12 deletes all information concerning the link 1 from the file storing unit 14 in association with the deletion of the file 1 which is the source file.

Figure 25:
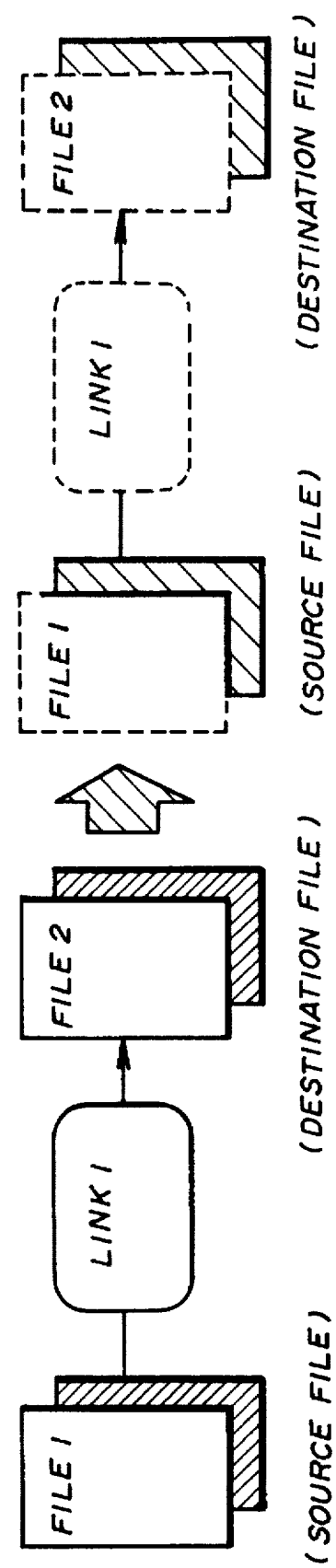
FIG. 25 is an illustration for explaining a function for a delete propagation through a link.
Figure 26:
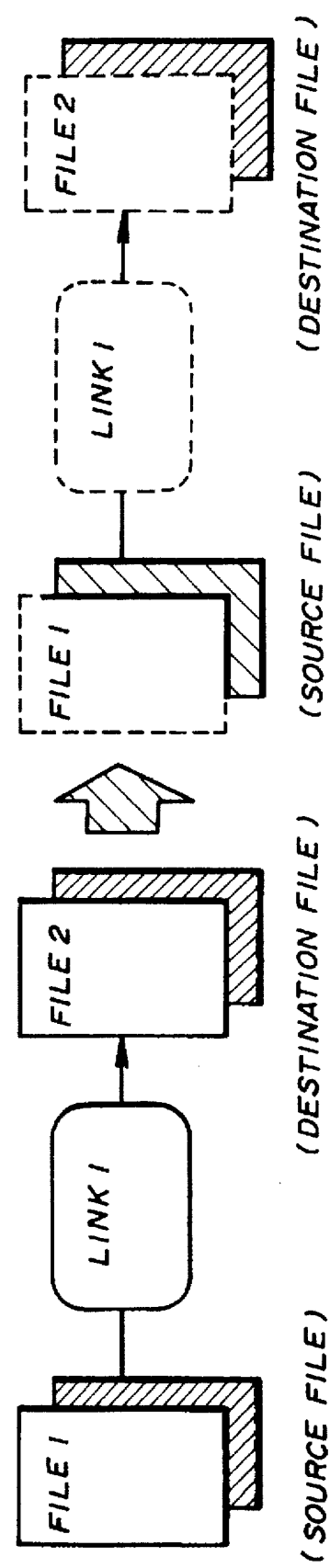
FIG. 26 is an illustration for explaining a function for deleting a source file with a related link.

Accordingly, in the present case, when the file 1 which is the source file is deleted from the system, the file 2 which is linked to the file 1 by the link 1 is automatically deleted and the link 1 is also deleted as shown in FIG. 25.

On the assumption that the file 1 is linked to the file 2 by the link 1, and the file 1 is defined as shown in FIG. 17A and the file 2 is defined as shown in FIG. 17B, the user 1 is able to delete the file 1 from the file server 10 in accordance with the deleting right on the file 1. That is, similar to the case shown in FIGS. 16A and 16B, when the user 1, who has the deleting right on the file 1, requests deletion of the file 1 to the file server 10, the control unit 12 deletes the file 1 from the file data storing unit 14 in accordance with the determination made by the access right control unit 124.

However, in the present case, since the flag in the delete propagation flag is set to the off-state, the file 2 is maintained to be stored in accordance with the determination of the link data control unit 125. That is, When the file 1 is deleted, the link 1 is deleted but the file 2 which was linked to the file 1 by the link 1 remains in the system.

Figure 27:
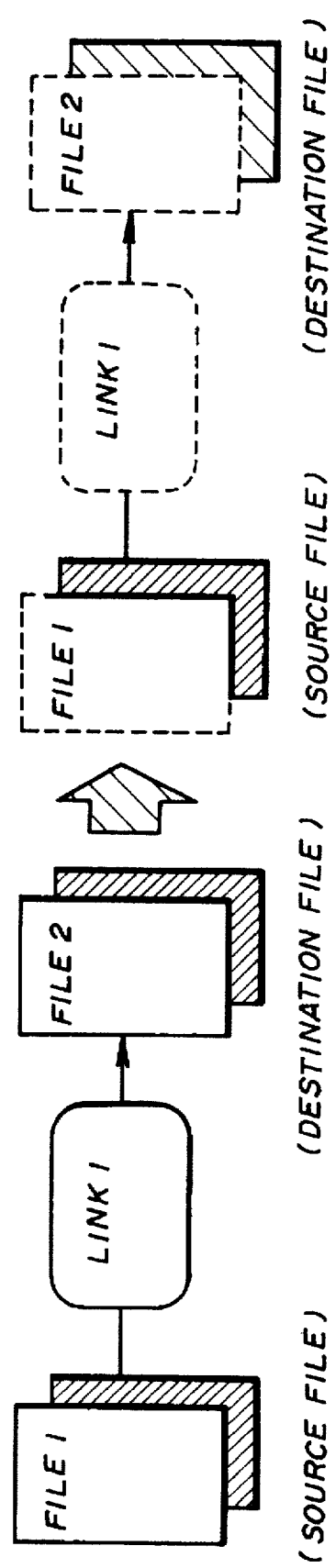
FIG. 27 is an illustration for explaining a function for deleting a link without deleting a related link.

In the above-mentioned case, the user 1 who has the deleting right on the file 2 is able to delete the file 2 from the file server 10 on the basis of the deleting right on the file 2. That is, when the user 1 requests to delete the file 2 to the file server 10, the control unit 12 deletes the file 2 from the file storing unit 14 in accordance with the determination of the access right control unit 124. At this time, since the link cancel value is set to "1", the link 1, the destination file of which is the deleted file 2, is maintained in the system. That is, when the file 2 is deleted, the file 1 and the link i remain in the system as shown in FIG. 27. It should be noted that the information concerning the destination file in the link control block of the file 1 may be automatically deleted when the file 2 is deleted.

Figure 28:
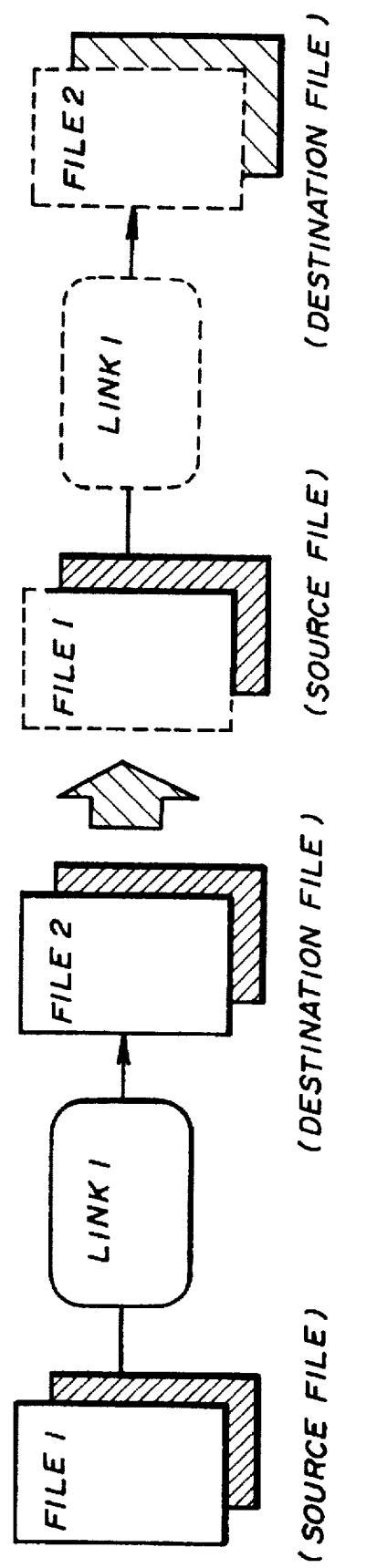
FIG. 28 is an illustration for explaining a function for deleting a destination file with a related link.

On the assumption that the file 1 is linked to the file 2 by the link 1, and the file 1 is defined as shown in FIG. 18A and the file 2 is defined as shown in FIG. 18B, the user 1 is able to delete the file 2 from the file server 10 in accordance with the deleting right on the file 2 in the same manner as that of the above-mentioned case. In the present case, it is determined by-the link data control unit 125 that the link cancel value is set to "2". According to this determination, the control unit 12 deletes the management information for the link 1 in the file storing unit 14. That is, the information in the link control block of the file 1 shown in FIG. 18A is deleted. Accordingly, in this case, the link 1 is canceled in association with the deletion of the file 2 as shown in FIG. 28.

On the assumption that the file 1 is linked to the file 2 by the link 1, and the file 1 is defined as shown in FIG. 19A and the file 2 is defined as shown in FIG. 19B, the user 1 is able to provide to the user 3 the deleting right on the file 1 by changing the status of the flag corresponding to the deleting right. That is, the user 1 can change the status of the flag corresponding to the deleting right of the user 3 on the basis of the owner right on the file 1. More specifically, when the user 1 requests to change the status of the flag corresponding to the deleting right of the user 3 from the off-state to the on-state, the access right control unit 124 changes the flag from the off-state to the on-state in accordance with the determination that the user 1 has the owner right on the file 1. As a result, the management information for the file 2 is updated as shown in FIG. 20A.

As mentioned above, when a request is made for changing the status of the deleting right of the user 3 on the file 1, the link data control unit 125 of the file server 10 checks the status of the flag in the access right increase propagation flags of the file 1. In the present case, the link data control unit 125 determines that the flag is in the on-state as shown in FIG. 19A. The access right control unit 124 then changes the status of the flag corresponding to the deleting right of the user 3 on the file 2 from the off-state to the on-state on the basis of the right of the user 2 who has the possession right on the link 1 regardless of which user has the owner right on the file 2. As a result, the management information of the file 2 is updated as shown in FIG. 20B.

As mentioned above, when the flag corresponding to the deleting right in the access right increase propagation flag is set to the on-state, and when the user 1 intends to provide the deleting right of the user 3 on the file 1 which is the source file, the deleting right of the user 3 on the file 2 can be automatically provided (increased) on the basis of the right of the user 2 who has the owner right on the link 1 regardless of the access right on the file 2.

On the assumption that the file 1 is linked to the file 2 by the link 1, and the file 1 is defined as shown in FIG. 21A and the file 2 is defined as shown in FIG. 21B, the user 1 is able to cancel the deleting right of the user 3 on the file 1 by changing the status of the flag corresponding to the deleting right. That is, the user 1 can change the status of the flag corresponding to the deleting right of the user 3 on the basis of the owner right on the file 1. More specifically, when the user 1 requests to change the status of the flag corresponding to the deleting right of the user 3 from the on-state to the off-state, the access right control unit 124 changes the flag from the on-state to the off-state in accordance with the determination that the user 1 has the owner right on the file 1. As a result, the management information for the file 1 is updated as shown in FIG. 22A.

As mentioned above, when a request is made for changing the status of the deleting right of the user 3 on the file 1, the link data control unit 125 of the file server 10 checks the status of the flag in the access right decrease propagation flag of the file 1. In the present case, the link data control unit 125 determines that the flag is in the on-state as shown in FIG. 21A. The result of the determination and the information indicating that the user 2 has the owner right on the link 1 which links the file 1 to the file 2 are provided to the access right control unit 124. The access right control unit 124 then changes the status of the flag corresponding to the deleting right of the user 3 on the file 2 from the on-state to the off-state on the basis of the right of the user 2 who has the owner right on the link 1 regardless of which user has the owner right on the file 2. As a result, the management information of the file 2 is updated as shown in FIG. 22B.

As mentioned above, when the flag corresponding to the deleting right in the access right decrease propagation flag is set to the on-state, and when the user 1 intends to provide the deleting right of the user 3 on the file 1 which is the source file, the deleting right of the user 3 on the file 2 can be automatically set to the off-state (decreased) on the basis of the right of the user 2 who has the owner right on the link 1 regardless of the access right on the file 2.

A further description will now be given of the characteristics of the above-mentioned memo-link (the link kind value of "1") and staple-link (the link kind value of "2").

It is assumed that the file 1 (source file) is linked to the file 2 (destination file) by the link 1 (refer to FIGS. 11 and 12), and the user has at least the copying right of the file 1. In this case, when the user produces a new file 1' by copying the file 1 at the end terminal unit 21(1), a new file 2' is produced by copying the file 2 which is linked to the file 1 by the link 1. Additionally, a new link 1' which links the new file 1' to the new file 2' is also established. The management information other than the link ID of the original link 1 is also copied as management information for the new memo-link 1'. Accordingly, the new file 1' is set as the source file and the new file 2' is set as the destination file.

By the above-mentioned process, the new file 1' and the new file 2', which are linked by the memo-link 1' similar to the construction shown in FIG. 11, are rendered to be managed in the file server 10. Additionally, the new files 1' and 2' are merely maintained in the file server 10, and there is no need to manage the new files 1' and 2' in this manner. That is, the file. 1 may be simply copied as the file 1'.

It is assumed that the file 1 (source file) is linked to the file 2 (destination file) by the link 1 (staple-link), and the file 1 is also linked to a plurality of files n (n=1,2, . . . , n) by respective links n-1 (staple-link), and that the user has at least the copying right of the file 1. In this case, when the user produces a new file 1' by copying the file 1 at the end terminal unit 21(1), a new file 2' is produced by copying the file 2 which is linked to the file 1 by the link 1. Additionally, in the file server 10, the links 2, . . . , n-1 which are related, to the link 1 are searched in that order so that new files 3', . . . , n' are produced as destination files by copying the files 3, . . . , n, respectively. Thereafter, new links (staple-links) 1',2', . . . , (n-1)' which link the new file 1' to each of the new files 2' to (n-1)', respectively, are produced in that order. Additionally, the management information other than the link ID of the original link 1 is copied as management information for the new link 1', and the new files 1' and 2' are defined as the source file as the destination file, respectively. The management information for the new links 2' to (n-1)' are also produced in the same manner as that of the new link 1', and the new file 1' and the new files m' (m'=3',4' . . . , n') are defined as the source file and the destination files, respectively. Additionally, the new links 2' to (n-1)' are added to the link list of the link 1' in that order.

By the above-mentioned process, the new file 1' and the new files 2' to n', which are linked by the new link 1' to (n-1)' similar to the construction shown in FIG. 8, are rendered to be managed in the file server 10. Additionally, the new files 1' to n' are merely maintained in the file server 10, and there is no need to manage the new files 1' to n' in this manner. That is, the file 1 may be simply copied as the file 1'.

In the above-mentioned embodiment, the access right of each user on the file is separately described from the access right of each user on the link which links the file to other files. The file and link are managed by the respective access right. Accordingly, each user can establish an independent link without interfering with a link established by other users. Additionally, since the management information for the link includes the file control information such as flags concerning the delete propagation, the access right increase propagation and the access right decrease propagation, a control provided to one of the files can be reflected to other files through the management information for the link.

The present invention is not limited to the specifically disclosed embodiments, and variations and modifications may be made without departing from the scope of the present invention.

What is claimed is:

1. A file managing system for managing a plurality of files being accessed by a plurality of users, said plurality of files including a first file and a second file linked to said first file by a link which relates said first file to said second file, said file managing system comprising:

first means for defining file controlling information which is provided to the files and represents a status of rights given to each of said users to operate the files and whether each of said users is permitted to change information including the status of the rights, each of said users being permitted to perform a processing which corresponds to one of the rights the status of which is in an on-state, said file controlling information being produced for each of said files;

second means for defining link controlling information for operations for the files and the link, said link controlling information including link information representing a condition of said link between said first file and said second file and first propagation information which represents whether a change in said file controlling information corresponding to said first file is to be reflected to said file controlling information corresponding to said second file, said link controlling information further including information which represents whether each of said users is permitted to use said link, said link controlling information being produced for each of said files; and first controlling means for controlling access of each of said users to said files and access of each of users to said link in accordance with said file controlling information and said link controlling information, said first controlling means including second controlling means for controlling operations including the access of each of said users to said files in accordance with said first information and said second controlling means including third controlling means for controlling a change of said file controlling information corresponding to said second file when said file controlling information corresponding to said first file is changed.

2. The file managing system as claimed in claim 1, wherein said link controlling information further includes second information which represents whether each of said users is permitted to change said link controlling information, and said first controlling means comprises fourth controlling means for controlling a change of said link controlling information in accordance with said second information.

3. The file managing system as claimed in claim 2, wherein said link controlling information further includes second propagation information which represents whether a processing performed on said first file is to be reflected to said second file, and said first controlling means further comprises fourth controlling means for controlling a processing performed on said second file, when said first file is processed, in accordance with said second propagation information.

4. The file managing system as claimed in claim 2, wherein said link controlling information includes link list information representing a link list which includes other links which are related to said link, said first controlling means comprising fourth controlling means for controlling use of said other links represented in said link list information.

5. The file managing system as claimed in claim 1, wherein said link controlling information further includes second information which represents whether each of said users is permitted to change said link controlling information, and said first controlling means comprises fourth controlling means for controlling a change of said link controlling information in accordance with said second information.

6. The file managing system as claimed in claim 5, wherein said link controlling information further includes second propagation information which represents whether a processing performed on said first file is to be reflected to said second file, and said second controlling means further comprises fifth controlling means for controlling a processing performed on said second file, when said first file is processed, in accordance with said first propagation information.

7. The file managing system as claimed in claim 5, wherein said link controlling information includes link list information representing a link list which includes other links which are related to said link, said first controlling means comprising fifth controlling means for controlling use of said other links represented in said link list information.

8. The file managing system as claimed in claim 1, wherein said link controlling information further includes second propagation information which represents whether a processing performed on said first file is to be reflected to said second file, and said first controlling means further comprises fourth controlling means for controlling a processing performed on said second file, when said first file is processed, in accordance with said second propagation information.

9. The file managing system as claimed in claim 8, wherein said second propagation information includes delete propagation information which represents whether a deletion of said first file is to be reflected to said second file so that a deletion of said second file is controlled, when said first file is deleted, in accordance with said delete propagation information.

10. The file managing system as claimed in claim 1, wherein said link controlling information further includes second propagation information which represents whether a processing performed on said first file is to be reflected to said second file, and said first controlling means further comprises fourth controlling means for controlling a processing performed on said second file, when said first file is processed, in accordance with said second propagation information.

11. The file managing system as claimed in claim 1, wherein said first propagation information includes increase propagation information which represents whether a change in status of one of the rights on said first file given to one of said users is to be reflected to a status of the corresponding rights on said second file given to said one of said users, said change being limited to an increase of a number of sorts of the rights which are in the on-state, the status of the rights on said second file being automatically changed to the on-state in accordance with said increase propagation information when the status of the rights on said first file is changed.

12. The file managing system as claimed in claim 1, wherein said first propagation information includes decrease propagation information which represents whether a change in the status of one of the rights on said first file given to one of said users is to be reflected to the status of the corresponding rights on said second file given to said one of said users, said change being limited to a decrease of a number of sorts of the rights which are in the on-state, the status of the rights on said second file being automatically changed to the off-state in accordance with said increase propagation information when the status of the rights on said first file is changed.

13. The file managing system as claimed in claim 1, wherein said link controlling information includes first link processing information which represents that a first processing performed on said first file is reflected to said link, said first controlling means comprising means for processing said link in accordance with said first link processing information so that said link is processed correspondingly to said first processing when said first file is processed.

14. The file managing system as claimed in claim 13, wherein said first link information includes link cancel information which represents that a deletion of said first file is reflected to said link so that said link is deleted, when said deletion is performed, in accordance with said link cancel information.

15. The file managing system as claimed in claim 1, wherein said link controlling information includes first link processing information which represents that one of a first processing performed on said first file and a second processing performed on said second file is reflected to said link, said first controlling means comprising means for processing said link in accordance with said first link processing information so that said link is processed correspondingly to said one of said first processing and said second processing when said one of said first file and said second file is processed.

16. The file managing system as claimed in claim 15, wherein said first link processing information includes link cancel information which represents that a deletion of one of said first file and said second file is reflected to said link so that said link is deleted, when said deletion is performed, in accordance with said link cancel information.

17. The file managing system as claimed in claim 1, wherein said link controlling information includes link list information representing a link list which includes other links which are related to said link, said first controlling means comprising fourth controlling means for controlling use of said other links represented in said link list information.

18. The file managing system is claimed in claim 1, wherein said link controlling information includes link list information representing a link list which includes other links which are related to said link, said first controlling means comprising fourth controlling means for controlling use of said other links represented in said link list information.

* * * * *

UNITED STATES PATENT AND TRADEMARK OFFICE
CERTIFICATE OF CORRECTION

PATENT NO. : 5,724,578
DATED : Mar. 3, 1998
INVENTOR(S) : MORINAGA et al.

It is certified that error appears in the above-identified patent and that said Letters Patent is hereby corrected as shown below:

TITLE PAGE:

[56] References Cited, under "FOREIGN PATENT DOCUMENTS", after the last reference, insert the following:

3-034067    2/1991    Japan
    4-270429    9/1992    Japan
    4-373040    12/1992    Japan
    5-061758    3/1993    Japan
    6-318167    11/1994    Japan

OTHER PUBLICATIONS

Morinaga et al., "Information Sharing Technology for Group Work," <u>JOURNAL OF INFORMATION PROCESSING SOCIETY OF JAPAN</u>, Vol.34, No.8, August 1993, ISSN 0447-8053, pages 1008-1013.

Col. 9, line 61, change "file 2" to --file 1--.

Col. 13, line 2 (Claim 6, line 5), change "second" (second occurrence) to --first--;
line 5 (Claim 6, line 8), change "first" to --second--.

Signed and Sealed this

Sixteenth Day of June, 1998

Attest:

BRUCE LEHMAN
Attesting Officer      Commissioner of Patents and Trademarks